United States Patent
Kagawa

(10) Patent No.: US 6,910,118 B2
(45) Date of Patent: Jun. 21, 2005

(54) TABLE MANAGEMENT TECHNIQUE

(75) Inventor: Koichi Kagawa, Tokyo (JP)

(73) Assignee: Allied Telesis Holdings K.K., Tokyo (JP)

( * ) Notice: Subject to any disclaimer, the term of this patent is extended or adjusted under 35 U.S.C. 154(b) by 840 days.

(21) Appl. No.: 09/886,372

(22) Filed: Jun. 22, 2001

(65) Prior Publication Data

US 2002/0169937 A1 Nov. 14, 2002

(30) Foreign Application Priority Data

May 10, 2001 (JP) .................................. 2001-139545

(51) Int. Cl.[7] .............................................. G06F 12/02
(52) U.S. Cl. ..................................... 711/216; 711/221
(58) Field of Search ............................... 711/216, 221; 707/3, 6; 370/395.32

(56) References Cited

U.S. PATENT DOCUMENTS

| 5,032,987 A | 7/1991 | Broder et al. | |
|---|---|---|---|
| 5,633,858 A | 5/1997 | Chang et al. | |
| 5,649,109 A | 7/1997 | Griesmer et al. | |
| 5,923,660 A | 7/1999 | Shemla et al. | |
| 6,678,678 B2 | * 1/2004 | Lee et al. | ........................ 707/3 |
| 6,775,281 B1 | * 8/2004 | Brown | ........................ 370/392 |

FOREIGN PATENT DOCUMENTS

WO  WO 01/24440 A2  4/2001

OTHER PUBLICATIONS

European Search Report dated Mar. 25, 2004.

* cited by examiner

Primary Examiner—Pierre M. Vital
(74) Attorney, Agent, or Firm—McGinn & Gibb, PLLC

(57) ABSTRACT

A table management method allowing efficient hash search with suppressing the possibility of occurrence of rehashing is disclosed. A MAC address table is divided into a plurality of banks, which are simultaneously accessed according to a hash output. Each of registered MAC addresses read out from respective ones of the banks is compared to the input MAC address. When a match is indicated by at least one comparison result, the input MAC address is judged to have been registered in the MAC address table. When no match is indicated by all comparison results, the input MAC address is judged as a new MAC address. If an available memory area is left in memory space of the banks concurrently accessed according to the hash output, then the new MAC address is registered in the available memory area.

13 Claims, 4 Drawing Sheets

TABLE MANAGEMENT TECHNIQUE

BACKGROUND OF THE INVENTION

1. Field of the Invention

The present invention relates to a table management technique, and in particular to a table management method and device allowing table access using degraded data having the number of bits smaller than that of input data.

2. Description of the Related Art

Hashing is a well-known method that is used to search a table. For example, in a standard LAN (Local-Area Network), MAC (Media Access Control) addresses are uniquely assigned to respective ones of all network devices. In such a LAN system, it is known that the hashing is used to search for a 48-bit MAC address.

Referring to FIG. 1, a 48-bit MAC address is converted to 10-bit data by a hash function 10 and the degraded 10-bit data is used as address data to obtain access to an entry table 11.

Here, it is assumed that the entry table 11 contains 1024 entries, each of which is composed of a MAC address (48 bits), a port number (4 bits) of a switch accommodating such MAC address, an access bit (1 bit) indicating a history of accesses to such MAC address, and a valid bit (1 bit) indicating a validity/invalidity of registration. Here, the number of bits of a port number depends on the number of ports of the switch. In this case, since a maximum number of 16 ports is assumed, 4 bits are needed for a port number.

Therefore, one entry of the entry table 11 is decided in accordance with a 10-bit address obtained by the hash function, and a registered MAC address included therein is read and output to a comparator 12. The comparator 12 compares the registered MAC address to an input MAC address to judge match/mismatch.

However, since the 48-bit input data is degraded to 10-bit degraded data by the hash function, there is a possibility that different input MAC addresses are mapped into the same address. The frequency of occurrence of this collision depends on how a hash function is selected. In the event of occurrence of a collision, rehashing is performed to change the hash function so as to generate different hash outputs for different input MAC addresses.

The rehashing causes all of contents stored in the entry table 11 to be invalid, resulting in significant performance reduction of MAC address learning. Therefore, in consideration of the hashing mechanism, it is an important issue how the occurrence of rehashing is suppressed.

SUMMARY OF THE INVENTION

An object of the present invention is to provide a table management method and device allowing efficient hash search with suppressing the possibility of occurrence of rehashing.

According to the present invention, a table management device uses degraded data as address data, wherein the degraded data is produced from input data having a predetermined number of bits, the degraded data having a smaller number of bits. The table management device includes: a plurality of tables allowed to be concurrently accessed according to the degraded data, wherein each of the tables is allowed to register a predetermined number of pieces of data, each of the pieces of data having a number of bits equal to the predetermined number of bits of the input data; a plurality of comparators provided for respective ones of the plurality of tables, wherein each of the comparators compares the input data to a piece of data read from a corresponding table according to the degraded data to produce a comparison result; and a determiner for determining from comparison results of the comparators whether the input data has been already registered in the tables.

The table management device may further include: a controller controlling the tables such that, when the input data has not been registered in the tables and an available memory area exists in memory space of the tables concurrently accessed according to the degraded data, the input data is registered as new data in the available memory area of the tables.

Each of the comparators may compare a corresponding piece of data to the input data to produce a comparison result indicating one of match and mismatch. The determiner may determine that the input data has been registered in the tables when a match-indicating comparison result is received from at least one of the comparators, and determines that the input data is not registered in the tables when a mismatch-indicating comparison result is received from each of the comparators.

According to another aspect of the present invention, a method for managing an address table which is divided into a plurality of banks, includes the steps of: a) converting input address data having a predetermined number of bits to address data having a smaller number of bits according to hash processing; b) concurrently accessing the banks according to the address data to read registered address data from each of the banks; c) comparing the input address data to the registered address data read from each of the banks to produce comparison results for respective ones of the banks; and d) determining from the comparison results whether the input address data has been registered in the address table.

The method may further include the steps of: e) when the input address data has not been registered in the address table, determining whether an available memory area exists in memory space of the banks concurrently accessed according to the address data; f) when an available memory area exists, registering the input address data as new address data in the available memory area; and g) when no available memory area exists, changing the hash processing.

As described above, according to the present invention, a plurality of tables are simultaneously accessed by the degraded data. The respective registered data having been read out are compared to the input data and the comparison results are used to determine whether the input data has been registered or not. Since a plurality of registered data is simultaneously accessed to read out, an extremely effective search can be performed.

Further, when the input data has not been registered at the tables and there is a free memory area in memory space of the tables accessed simultaneously by the degraded data, the input data is registered as new data in the available memory area. Therefore, a plurality of different input data can be stored in the memory space of the tables accessed simultaneously by the same degraded data. In other words, since one degraded data can be associated with a plurality of different registered data, the probability of occurrence of rehashing can be significantly reduced. That is, only when there is left no memory area in the accessed memory space of the banks, a hash function or an algorithm for generating the degraded data from the input data is changed. Thus, compared with the prior art, the probability of occurrence of rehashing is significantly reduced.

DESCRIPTION OF THE PREFERRED EMBODIMENT

Figure 1:
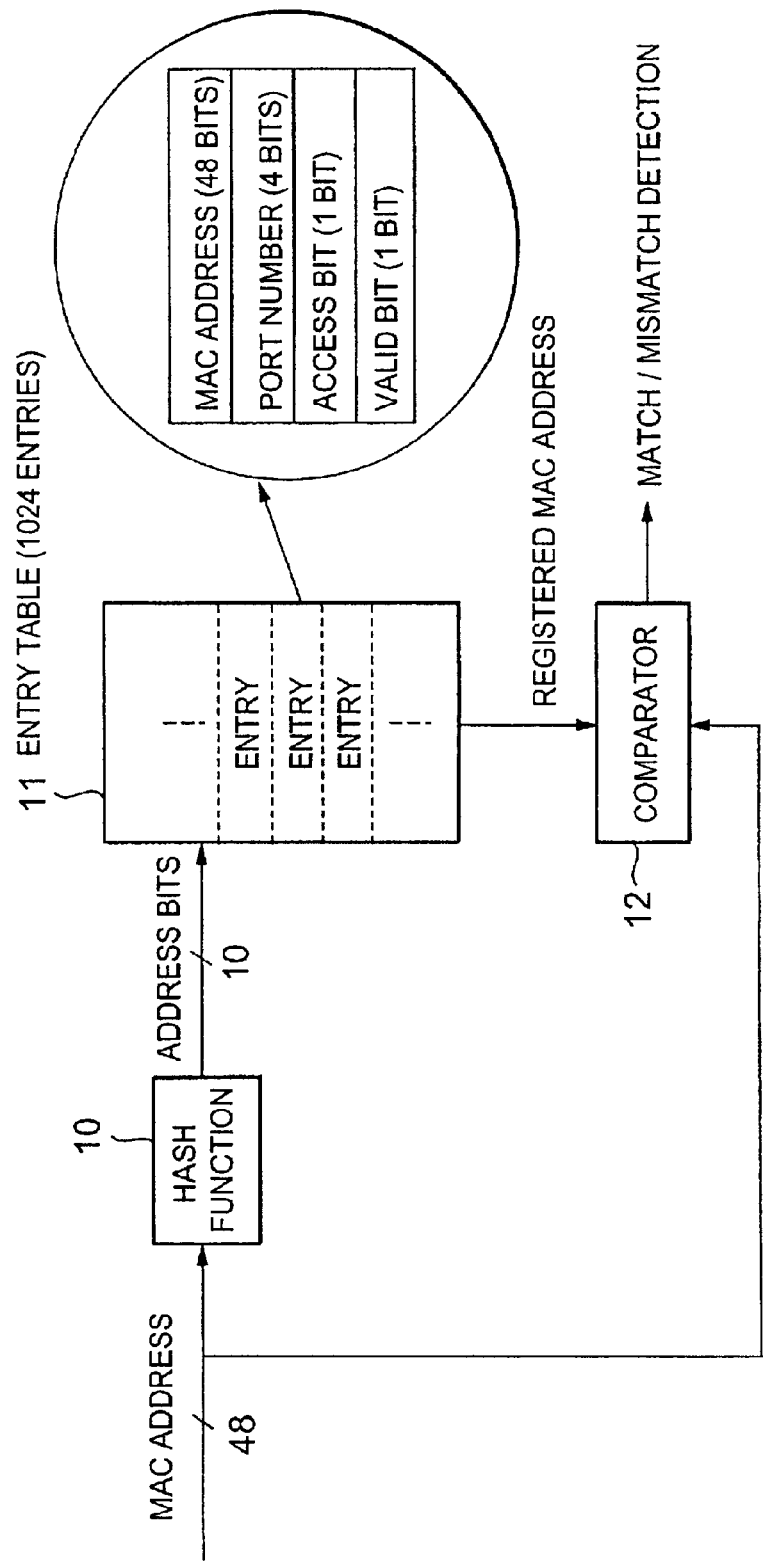
FIG. 1 is a block diagram showing a conventional management device which manages a MAC address table.
Figure 2:
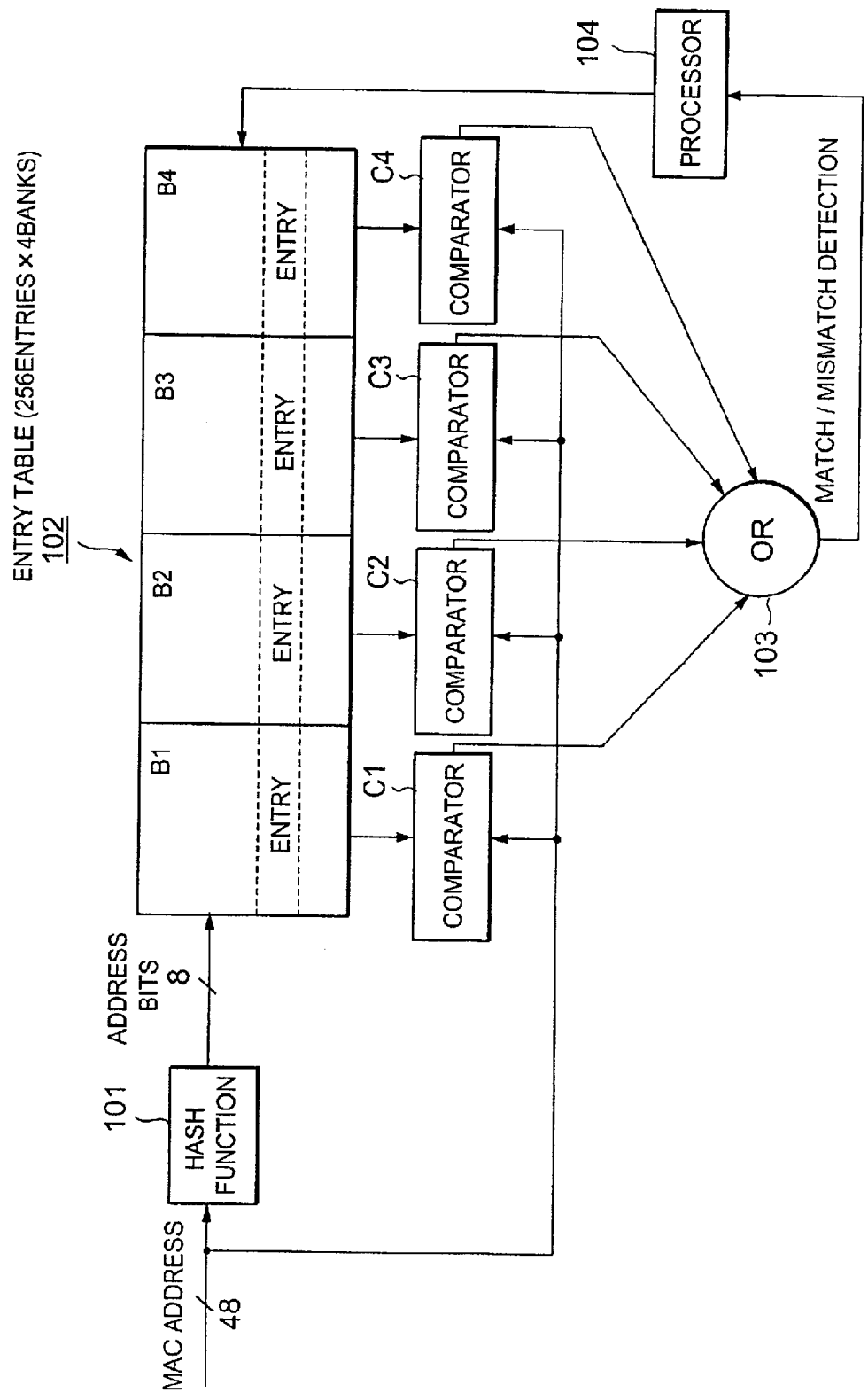
FIG. 2 is a block diagram showing an address table management device according to an embodiment of the present invention.

Referring to FIG. 2, an address table management device according to an embodiment of the present invention is provided with an entry table 102 which is divided into a plurality of banks. For simplicity, assuming that the entry table 102 is divided into four banks B1–B4, each of the banks B1–B4 stores a maximum number of 256 entries and therefore the entry table 102 can store a total of 1024 entries (=254 entries×4 banks). As the conventional case, each entry is composed of a 48-bit MAC address, a 4-bit port number, a 1-bit access bit, and a 1-bit valid bit (see FIG. 4).

The hash function 101 performs the CRC 32 calculation of an input 48-bit MAC address and selects eight (8) bits at a predetermined position out of 32-bit output obtained by the CRC 32 calculation to output the selected 8-bit data to the entry table 102. The banks B1–B4 of the entry table 102 simultaneously input the selected 8-bit data as address data from the hash function 101. Therefore, a single hash output (8-bit address data) allows simultaneous access to memory areas of the banks B1–B4 specified by the hash output.

When at lest one entry exists in the accessed memory areas of the banks B1–B4, the registered MAC address included in each entry is simultaneously read out. Since the maximum number of entries in each bank is 256, 8 bits are needed to discriminate the entries. For example, in the case where a table having 1024 entries is equally divided into 8 banks with the maximum number of 128 entries for each bank, the output of hash function 101 is set to 7 bits.

Comparators C1–C4 compare four registered MAC addresses read out from the banks B1 to B4 to the input MAC address, respectively. The respective comparators C1–C4 output comparison results (match or mismatch) to an OR circuit 103. When the OR circuit 103 detects a match in at least one of comparison results, the OR circuit 103 outputs a match detection signal to a processor 104. If no match is detected, the OR circuit 103 outputs a mismatch detection signal to the processor 104.

The processor 104 is a program-controlled processor such as CPU or a dedicated hardware circuit, which is designed to manage the entry table 102. The processor 104 executes a table management program to perform registration (learning) and searching processes for the banks B1–B4 while monitoring the detection result (match or mismatch) given by the OR circuit 103, which will be described hereafter. The table management program is stored in a recording medium (not shown) such as a read-only memory, a magnetic disk, an optical disk, or a magneto-optic disk.

Registration or Learning Process

It is assumed that some MAC addresses have been already registered in each bank of the entry table 102. A registration procedure for registering a new MAC address in the banks B1–B4 will be described with reference to FIGS. 3 and 4.

Figure 3:
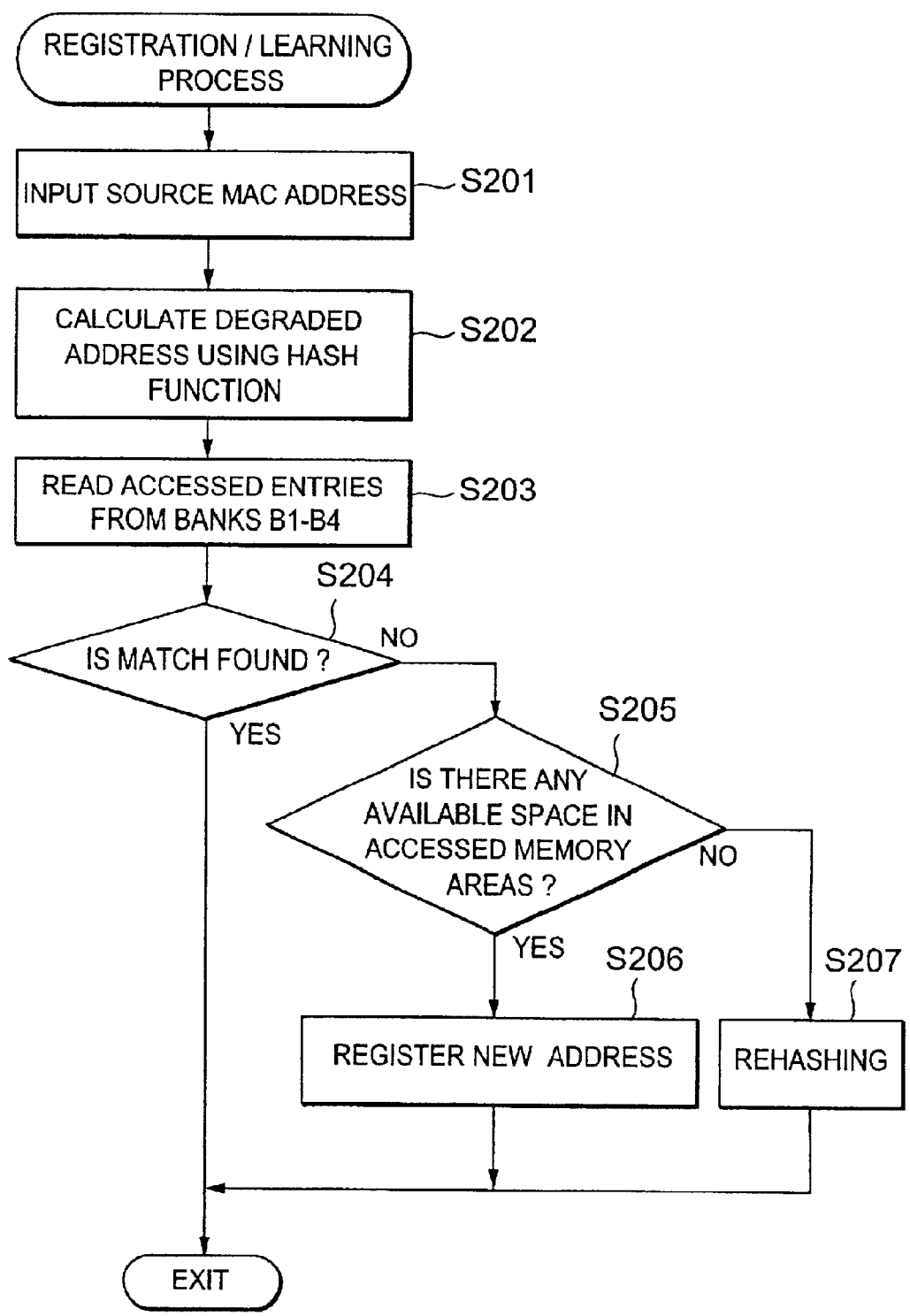
FIG. 3 is a flow chart showing a registration/learning operation of a MAC address table according to the present embodiment.

Referring to FIG. 3, when the source MAC address of a packet is inputted (step S201), an 8-bit address is calculated as a degraded address by the above-mentioned hash function 101 (step S202). The respective memory areas of the banks B1–B4 specified by the 8-bit address are simultaneously accessed to read corresponding entries, and when a MAC address is validly registered in the corresponding entry, it is read out (step S203).

When receiving the registered MAC addresses from the banks B1–B4, the respective comparators C1–C4 compare the registered MAC addresses to the source MAC address and output comparison results (match or mismatch) to the OR circuit 103. As described above, the OR circuit 103 outputs a match detection signal to the processor 104 when at least one of the comparison results indicates a match. Contrarily, when all the comparison results indicate a mismatch, the OR circuit 103 outputs a mismatch detection signal to the processor 104.

When receiving a match detection signal from the OR circuit 103 (YES in step S204), the processor 104 determines that the input source MAC address has been already registered in the entry table 102 and therefore does not perform a registration/learning process.

When receiving a mismatch detection signal from the OR circuit 103 (NO in step S204), the processor 104 determines that the input source MAC address is a new address and then determines whether the four accessed memory areas of the banks B1–B4 include free space (step S205).

When available memory space exists in the four accessed memory areas (YES in step S205), the source MAC address is registered as a new address at an available one of the four accessed memory areas (step S206). This is a learning process. When all of the four memory areas have been occupied (NO in step S205), the rehashing operation is executed (step S207). As an example, the rehashing is carried out by clearing all of valid bits and selecting 8-bit data at different position from the 32-bit CRC 32 output.

Figure 4:
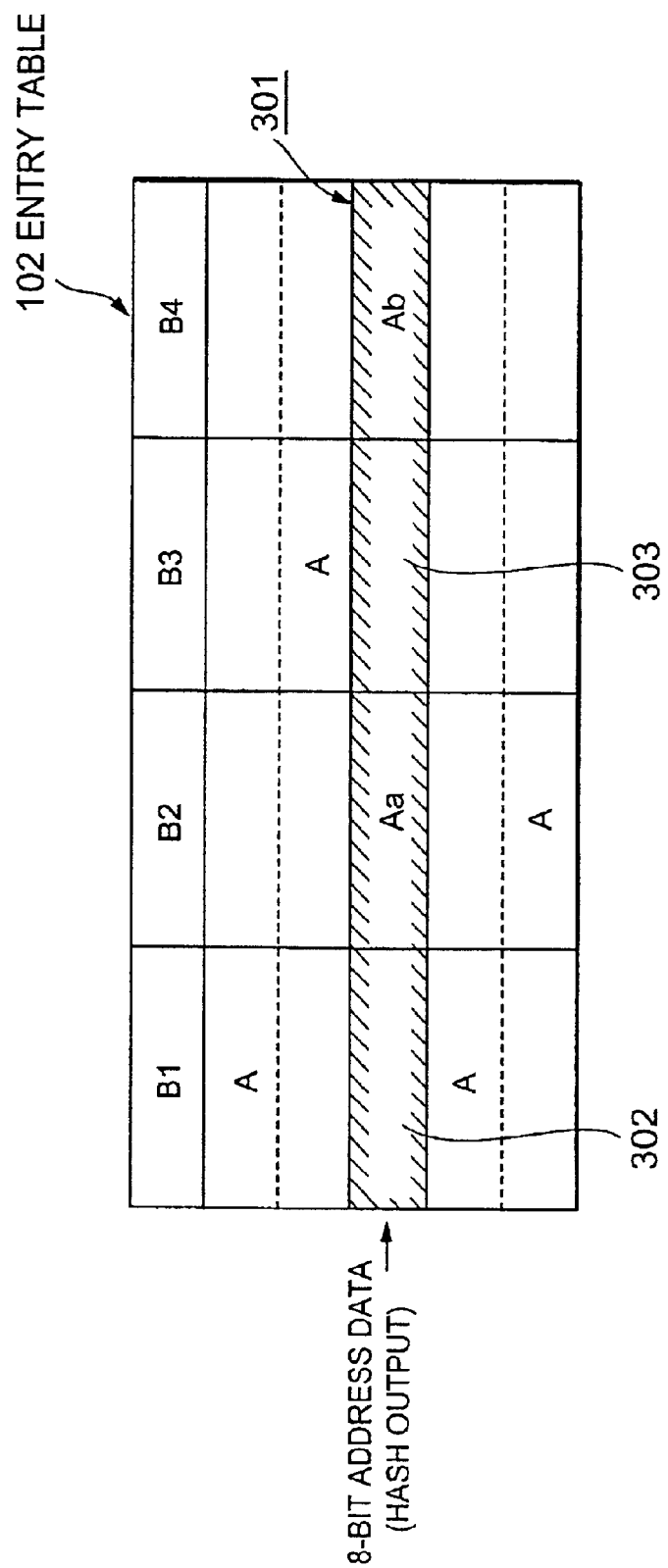
FIG. 4 is a schematic diagram showing an entry table for explaining a new address registration operation in the present embodiment.

As shown in FIG. 4, it is assumed that memory space 301 of the banks B1–B4 in the entry table 102 is accessed by an 8-bit address which is an output of the hash function 101. It is further assumed that respective areas of the banks B2 and B4 have already registered MAC addresses Aa and Ab, and respective areas 302 and 303 of the banks B1 and B3 are available.

Even if a source MAC address Ac produces the same hash output indicating the memory space 301, as long as the source MAC address Ac is different from either of the registered MAC addresses Aa and Ab (mismatch: NO in step S204 of FIG. 3), this source MAC address Ac is registered as a new address in, for example, a free area 302 of the bank B1. Similarly, even if another source MAC address Ad produces the same hash output indicating the memory space 301, if it is different from either of the registered addresses Aa, Ab and Ac, then the source MAC address Ad is registered as a new address in a free area 303 of the bank B3. In this way, four different MAC addresses can be registered for the same hash output in the entry table 102.

The rehashing occurs only when another source MAC address Ae produces the same hash output indicating the memory space 301 having no memory space left. In the present embodiment, since up to four MAC addresses can reliably be registered, the frequency of occurrence of rehashing can be significantly reduced.

Also, the present embodiment allows high-speed learning because the four registered MAC addresses are simultaneously read out and are simultaneously compared to the source MAC addresses by the four comparators C1–C4.

Searching Process

When a destination MAC address of a packet to be forwarded is input, an 8-bit address is calculated by the above-described hash function 101. The memory areas of banks B1–B4 at the 8-bit address are simultaneously accessed, and when a valid MAC address is registered in the accessed memory areas, it is read out. Then, the respective comparators C1–C4 compare the read-out registered MAC addresses to the destination MAC address, and respective comparison results (match or mismatch) are output to the OR circuit 103. As described above, the OR circuit 103 detects match or mismatch depending on whether at least one of comparison results indicates match or all comparison results indicate a mismatch.

When a match is detected, the processor 104 reads out the port number of a corresponding registered MAC address and designates it as a forwarding destination of the packet. When a mismatch is detected, the processor 104 forwards the packet as a broadcast packet to all output ports of the switch.

Also, in the present embodiment, although the entry table 102 is divided into 4 parts, it may be divided into an arbitrary number N of parts. In the case where N is larger than 4, since N different addresses can be registered for the same hash function value, the probability of occurrence of rehashing is further decreased.

In the case of the entry table divided into a plurality of banks, there are needed as many comparators as the banks. However a comparator has a simple circuit, it does not become a significant burden on a system.

Architecture of the present invention can be applied to not only the management of a MAC address table but the table searching or data registration techniques. Further, arbitrary hash function may be employed.

What is claimed is:

1. A table management device using degraded data as address data, wherein the degraded data is produced from input data having a predetermined number of bits, the degraded data having a smaller number of bits, the table management device comprising:

a plurality of tables adapted to be concurrently accessed according to the degraded data, wherein each of the tables is adapted to register a predetermined number of pieces of data, each of the pieces of data having a number of bits equal to the predetermined number of bits of the input data;

a plurality of comparators provided for respective ones of the plurality of tables, wherein each of the comparators is adapted to compare the input data to a piece of data read from a corresponding table according to the degraded data to produce a comparison result;

a determiner for determining from comparison results of the comparators whether the input data has been already registered in the tables; and a controller for controlling the tables such that, when the input data has not been registered in the tables and an available memory area exists in memory space of the tables concurrently accessed according to the degraded data, the input data is registered as new data in the available memory area of the tables.

2. The table management device according to claim 1, wherein each of the comparators is adapted to compare a corresponding piece of data to the input data to produce a comparison result indicating one of match and mismatch; and the determiner is adapted to determine that the input data has been registered in the tables when a match-indicating comparison result is received from at least one of the comparators, and to determine that the input data is not registered in the tables when a mismatch-indicating comparison result is received from each of the comparators.

3. A method for managing an address table which is divided into a plurality of banks, the method comprising:

converting input address data having a predetermined number of bits to address data having a smaller number of bits according to hash processing;

concurrently accessing the banks according to the address data to read registered address data from each of the banks;

comparing the input address data to the registered address data read from each of the banks to produce comparison results for respective ones of the banks;

determining from the comparison results whether the input address data has been registered in the address table;

when the input address data has not been registered in the address table, determining whether an available memory area exists in memory space of the banks concurrently accessed according to the address data;

when an available memory area exists, registering the input address data as new address data in the available memory area; and when no available memory area exists, changing the hash processing.

4. The method according to claim 3, wherein, in converting the input address data, the hash processing is performed by selecting a desired number of bits at a predetermined position from 32-bit data obtained by CRC32 calculation.

5. The method according to claim 4, wherein, in changing the hash processing, the hash processing is changed by selecting the desired number of bits at another position different from the predetermined position from the 32-bit data obtained by the CRC 32 calculation.

6. A table management device using a hash output value as an address, wherein the hash output value is obtained by converting an input MAC (media access control) address based on a hash function, the table management device comprising:

a MAC address table which is divided into a plurality of banks adapted to be concurrently accessed using the hash output value as an address;

a plurality of comparators provided for respective ones of the plurality of banks, wherein each of the comparators adapted to compare the input MAC address to a registered MAC address read from a corresponding bank according to the hash output value, to produce a comparison result;

a determiner for determining from comparison results of the comparators whether the input MAC address has been already registered in the MAC address table; and a controller for controlling the MAC address table such that, when the input MAC address has not been registered in the MAC address table and an available memory area exists in memory space of the MAC address table accessed according In the hash output value, the input MAC address is registered as a new MAC address in the available memory area of the MAC address table.

7. The table management device according to claim 6, wherein each of the comparators is adapted to compare a corresponding registered MAC address to the input MAC address so as to produce a comparison result indicating one of match and mismatch; and the determiner is adapted to determine that the input MAC address has been registered in the MAC address table when a match-indicating comparison result is received from at least one of the comparators, and determines that the input MAC address is not registered in the MAC address table when a mismatch-indicating comparison result is received from each of the comparators.

8. A method for managing a plurality of tables, the method comprising:

converting input data having a predetermined number of bits to degraded data having a smaller number of bits according to a predetermined algorithm;

concurrently accessing the plurality of tables according to the degraded data to read registered data from each of the tables;

comparing the input data to the registered data read from each of the banks to produce comparison results for respective ones of the tables;

determining from the comparison results whether the input data has been registered in the tables;

when the input data has not been registered in the tables, determining whether an available memory area exists in memory space of the tables concurrently accessed according to the degraded data; and when an available memory area exists, registering the input data as new data in the available memory area.

9. The method according to claim 8, further comprising:

changing the predetermined algorithm when no available memory area exists.

10. A computer program for use in a computer to manage a plurality of tables, the program, when activated, causing the computer to:

convert input data having a predetermined number of bits to degraded data having a smaller number of bits according to a predetermined algorithm;

concurrently access the plurality of tables according to the degraded data to read registered data from each of the tables;

compare the input data to the registered data read from each of the banks to produce comparison results for respective ones of the tables;

determine from the comparison results whether the input data has been registered in the tables;

when the input data has not been registered in the tables, determine whether an available memory area exists in memory space of the tables concurrently accessed according to the degraded data; and when an available memory area exists, register the input data as new data in the available memory area.

11. The computer program according to claim 10, wherein the program, when activated, further causes the computer to:

change the predetermined algorithm when no available memory area exists.

12. A computer system comprising:

a plurality of tables; and a processor on which a program is to run, wherein the program, when activated, causes the computer to:

convert input data having a predetermined number of bits to degraded data having a smaller number of bits according to a predetermined algorithm;

concurrently access the plurality of tables according to the degraded data to read registered data from each of the tables;

compare the input data to the registered data read from each of the banks to produce comparison results for respective ones of the tables;

determine from the comparison results whether the input data has been registered in the tables;

when the input data has not been registered in the tables, determine whether an available memory area exists in memory space of the tables concurrently accessed according to the degraded data; and when an available memory area exists, register the input data as new data in the available memory area.

13. The computer system according to claim 12, wherein the program, when activated, further causes the computer to:

change the predetermined algorithm when no available memory area exists.

* * * * *